United States Patent
Ellison et al.

(10) Patent No.: US 10,114,573 B1
(45) Date of Patent: Oct. 30, 2018

(54) DYNAMIC REDUCTION OF STACK-OVERFLOW ERRORS IN A RECURSIVE DATA-SERIALIZATION ALGORITHM

(71) Applicant: International Business Machines Corporation, Armonk, NY (US)

(72) Inventors: Timothy P. Ellison, Hampshire (GB); Amit S. Mane, Bangalore (IN); Sathiskumar Palaniappan, Namakkal (IN); Vijay Sundaresan, North York (CA)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/497,627

(22) Filed: Apr. 26, 2017

(51) Int. Cl.
  *G06F 9/44* (2018.01)
  *G06F 3/06* (2006.01)

(52) U.S. Cl.
  CPC .......... *G06F 3/0638* (2013.01); *G06F 3/0619* (2013.01); *G06F 3/0652* (2013.01); *G06F 3/0673* (2013.01)

(58) Field of Classification Search
  CPC .... G06F 3/0636; G06F 3/0619; G06F 3/0673; G06F 3/0652
  See application file for complete search history.

(56) References Cited

U.S. PATENT DOCUMENTS

| | | | |
|---|---|---|---|
| 6,424,934 B2 * | 7/2002 | Welfeld | H04L 45/00 703/25 |
| 8,396,904 B2 | 3/2013 | Ylonen | |
| 9,342,492 B1 * | 5/2016 | Warila | G06F 8/24 |
| 2010/0185632 A1 * | 7/2010 | Ylonen | G06F 17/30607 707/756 |
| 2012/0174084 A1 | 7/2012 | Chapman et al. | |
| 2013/0339975 A1 * | 12/2013 | Busaba | G06F 9/44 718/104 |
| 2016/0011957 A1 | 1/2016 | Bates et al. | |

\* cited by examiner

*Primary Examiner* — Chameli Das
(74) *Attorney, Agent, or Firm* — Schmeiser, Olsen & Watts, LLP; Nicholas Bowman

(57) ABSTRACT

A data-serialization system initially uses a recursive serialization algorithm to serialize a hierarchy of nested data objects by translating those objects into a serial stream of data. The system determines that a stack-overflow error is likely to occur whenever the number of objects serialized by the system exceeds a threshold value, or whenever the stack has reached an unacceptable level of utilization. When the system determines that a stack-overflow error is likely or if the system detects that a stack-overflow error will definitely occur if another object is serialized, the system either transfers control to a nonrecursive algorithm that does not require a stack data structure or reduces stack utilization by transferring contents of the stack to a variable-size queue-like data structure.

17 Claims, 9 Drawing Sheets

DYNAMIC REDUCTION OF STACK-OVERFLOW ERRORS IN A RECURSIVE DATA-SERIALIZATION ALGORITHM

BACKGROUND

The present invention relates to data serialization in general and, in particular, to efficiently and reliably serializing large data sets.

Data serialization is any type of procedure that translates a structured set of data objects, like a complex data structure, a graph, or a system state, into a serial stream of digital data. Serializing a complex data set may greatly reduce the storage size and overhead required to store and maintain dynamic data structures. Serialization is useful, for example, when a time-varying state of a system must be saved and then later restored (or "deserialized") in its original form. Such procedures are often used to improve performance of distributed software applications or to capture transient system states in a persistent form that may be recovered at a later time.

SUMMARY

An embodiment of the present invention provides a data-serialization system comprising a processor, a memory coupled to the processor, and a computer-readable hardware storage device coupled to the processor, the storage device containing program code configured to be run by the processor via the memory to implement a method for dynamic reduction of stack-overflow errors in a recursive data-serialization procedure, the method comprising:

launching the recursive data-serialization procedure to serialize each object of a hierarchy of serializable data objects, where the recursive data-serialization procedure temporarily stores a state of a partially serialized object as a frame of a stack data structure, where each object is capable of comprising at least one field, where each field of the at least one field is either a primitive field or a reference field, where a primitive field stores a value, where a first reference field of a parent object of the hierarchy identifies another object of the hierarchy, and where the another object is organized within the hierarchy as a child of the first reference field;

determining that a threshold condition has been satisfied, where the threshold condition is selected such that satisfaction of the threshold condition indicates an unacceptable likelihood that the recursive data-serialization procedure will generate a stack-overflow error; and performing a corrective action in response to the determining, where the corrective action is capable of preventing the stack-overflow error.

Another embodiment of the present invention provides a method for dynamic reduction of stack-overflow errors in a recursive data-serialization procedure, the method comprising:

launching the recursive data-serialization procedure to serialize each object of a hierarchy of serializable data objects, where the recursive data-serialization procedure temporarily stores a state of a partially serialized object as a frame of a stack data structure, where each object is capable of comprising at least one field, where each field of the at least one field is either a primitive field or a reference field, where a primitive field stores a value, where a first reference field of a parent object of the hierarchy identifies another object of the hierarchy, and where the another object is organized within the hierarchy as a child of the first reference field;

determining that a threshold condition has been satisfied, where the threshold condition is selected such that satisfaction of the threshold condition indicates an unacceptable likelihood that the recursive data-serialization procedure will generate a stack-overflow error; and performing a corrective action in response to the determining, where the corrective action is capable of preventing the stack-overflow error.

Yet another embodiment of the present invention provides a computer program product, comprising a computer-readable hardware storage device having a computer-readable program code stored therein, the program code configured to be executed by a data-serialization system comprising a processor, a memory coupled to the processor, and a computer-readable hardware storage device coupled to the processor, the storage device containing program code configured to be run by the processor via the memory to implement a method for dynamic reduction of stack-overflow errors in a recursive data-serialization procedure, the method comprising:

launching the recursive data-serialization procedure to serialize each object of a hierarchy of serializable data objects, where the recursive data-serialization procedure temporarily stores a state of a partially serialized object as a frame of a stack data structure, where each object is capable of comprising at least one field, where each field of the at least one field is either a primitive field or a reference field, where a primitive field stores a value, where a first reference field of a parent object of the hierarchy identifies another object of the hierarchy, and where the another object is organized within the hierarchy as a child of the first reference field;

determining that a threshold condition has been satisfied, where the threshold condition is selected such that satisfaction of the threshold condition indicates an unacceptable likelihood that the recursive data-serialization procedure will generate a stack-overflow error; and performing a corrective action in response to the determining, where the corrective action is capable of preventing the stack-overflow error.

DETAILED DESCRIPTION

Figure 1:
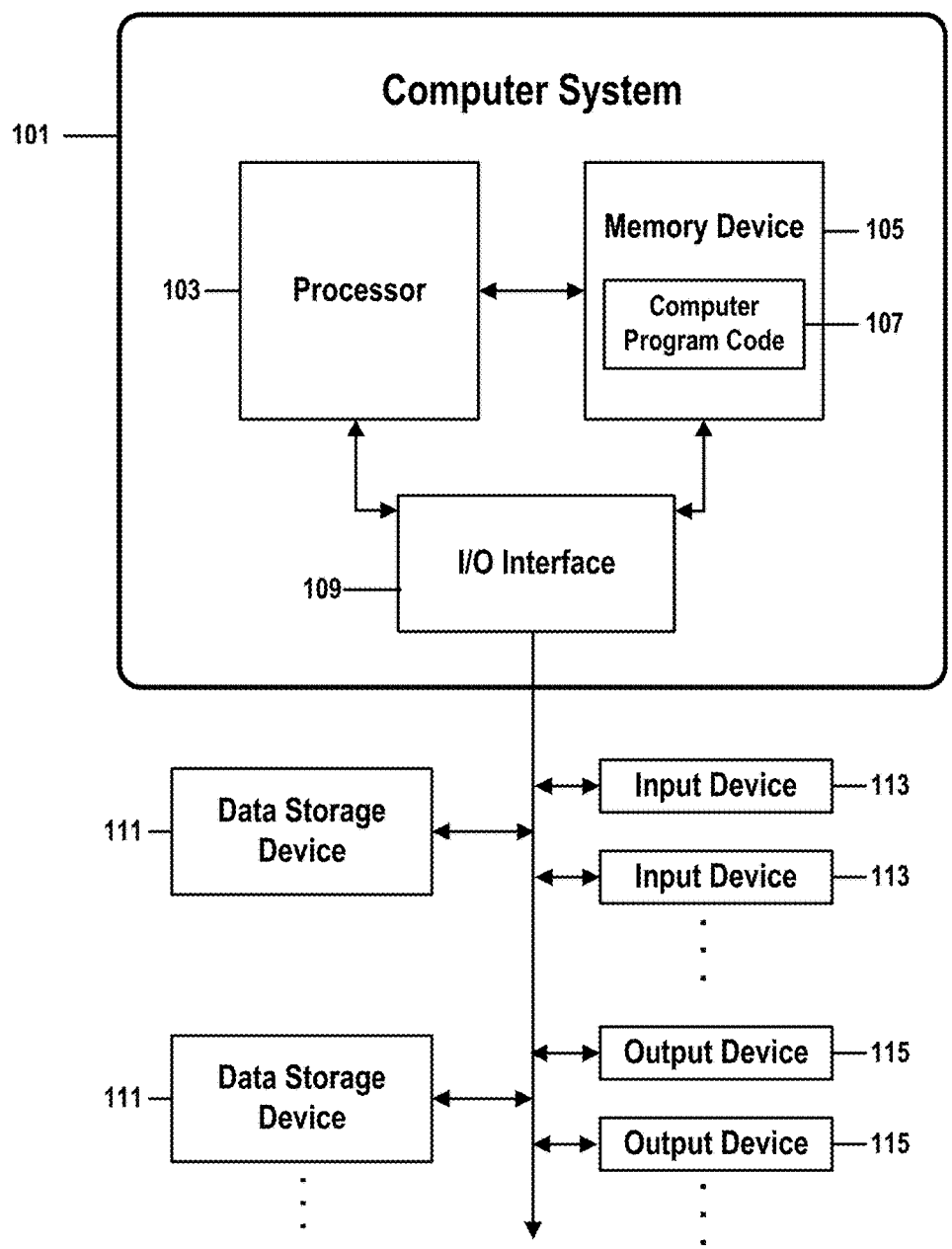
FIG. 1 shows the structure of a computer system and computer program code that may be used to implement a method for dynamic reduction of stack-overflow errors in a recursive data-serialization algorithm in accordance with embodiments of the present invention.

Embodiments of the present invention present a technical solution to a technical problem that arises from computerized data-serialization technology.

Data serialization is a type of procedure that "flattens" a structured data object, such as a directed graph or a hierarchical data structure, by translating the object a linear stream of serial data. Serialization allows state vectors and other complex or dynamic objects to be stored in a simple, persistent form that allows the stored objects to be perfectly reconstructed at a later time or to be more easily passed between application domains or over a network for later reconstruction in a different environment or platform.

There are many methods of serializing data, some of which comprise recursive algorithms and stack data structures. Recursive serialization algorithms, however, are prone to stack-overflow errors when used to serialize large, deeply nested data sets. Known recursive serialization frameworks, such as Java and the open-source serializer Kryo, thus may not be able to reliably serialize the types of complex data sets common in many distributed applications.

Nonrecursive serialization algorithms are sometimes used to increase the reliability and robustness of recursive algorithms. But such alternatives may suffer from bottlenecks and reduced performance that make them less useful in many distributed applications.

There is thus a need for a way to efficiently and reliably serialize large data structures. Embodiments of the present invention provide a novel way to accomplish this goal by intelligently switching a data-serialization procedure between recursive and nonrecursive serialization algorithms. These methods are intended to produce an optimal trade-off between performance and robustness, relying on higher-performance recursive procedures only so long as recursion can be used without significant risk of errors.

These embodiments provide technical solutions to data-serialization errors that occur only in computerized data-processing systems. Stack-overflow errors are a technical by-product of computer technologies, like data-serialization, that incorporate stack data structures. Furthermore, data-serialization technology is itself a solution to a technical problem that is specific computerized systems that must resolve performance and efficiency problems of other computer programs that use large or complex data structures. A necessarily technical solution is thus required to resolve the stack-allocation problem that is necessarily rooted in data-serialization systems.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

FIG. 1 shows a structure of a computer system and computer program code that may be used to implement a method for dynamic reduction of stack-overflow errors in a recursive data-serialization algorithm in accordance with embodiments of the present invention. FIG. 1 refers to objects 101-115.

In FIG. 1, computer system 101 comprises a processor 103 coupled through one or more I/O Interfaces 109 to one or more hardware data storage devices 111 and one or more I/O devices 113 and 115.

Hardware data storage devices 111 may include, but are not limited to, magnetic tape drives, fixed or removable hard disks, optical discs, storage-equipped mobile devices, and solid-state random-access or read-only storage devices. I/O devices may comprise, but are not limited to: input devices 113, such as keyboards, scanners, handheld telecommunications devices, touch-sensitive displays, tablets, biometric readers, joysticks, trackballs, or computer mice; and output devices 115, which may comprise, but are not limited to printers, plotters, tablets, mobile telephones, displays, or sound-producing devices. Data storage devices 111, input devices 113, and output devices 115 may be located either locally or at remote sites from which they are connected to I/O Interface 109 through a network interface.

Processor 103 may also be connected to one or more memory devices 105, which may include, but are not limited to, Dynamic RAM (DRAM), Static RAM (SRAM), Programmable Read-Only Memory (PROM), Field-Programmable Gate Arrays (FPGA), Secure Digital memory cards, SIM cards, or other types of memory devices.

At least one memory device 105 contains stored computer program code 107, which is a computer program that comprises computer-executable instructions. The stored computer program code includes a program that implements a method for dynamic reduction of stack-overflow errors in a recursive data-serialization algorithm in accordance with embodiments of the present invention, and may implement other embodiments described in this specification, including the methods illustrated in FIGS. 1-8. The data storage devices 111 may store the computer program code 107. Computer program code 107 stored in the storage devices 111 is configured to be executed by processor 103 via the memory devices 105. Processor 103 executes the stored computer program code 107.

In some embodiments, rather than being stored and accessed from a hard drive, optical disc or other writeable, rewriteable, or removable hardware data-storage device 111, stored computer program code 107 may be stored on a static, nonremovable, read-only storage medium such as a Read-Only Memory (ROM) device 105, or may be accessed by processor 103 directly from such a static, nonremovable, read-only medium 105. Similarly, in some embodiments, stored computer program code 107 may be stored as computer-readable firmware 105, or may be accessed by processor 103 directly from such firmware 105, rather than from a more dynamic or removable hardware data-storage device 111, such as a hard drive or optical disc.

Thus the present invention discloses a process for supporting computer infrastructure, integrating, hosting, maintaining, and deploying computer-readable code into the computer system 101, wherein the code in combination with the computer system 101 is capable of performing a method for dynamic reduction of stack-overflow errors in a recursive data-serialization algorithm.

Any of the components of the present invention could be created, integrated, hosted, maintained, deployed, managed, serviced, supported, etc. by a service provider who offers to facilitate a method for dynamic reduction of stack-overflow errors in a recursive data-serialization algorithm. Thus the present invention discloses a process for deploying or integrating computing infrastructure, comprising integrating computer-readable code into the computer system 101, wherein the code in combination with the computer system 101 is capable of performing a method for dynamic reduction of stack-overflow errors in a recursive data-serialization algorithm.

One or more data storage units 111 (or one or more additional memory devices not shown in FIG. 1) may be used as a computer-readable hardware storage device having a computer-readable program embodied therein and/or having other data stored therein, wherein the computer-readable program comprises stored computer program code 107. Generally, a computer program product (or, alternatively, an article of manufacture) of computer system 101 may comprise the computer-readable hardware storage device.

While it is understood that program code 107 for a method for dynamic reduction of stack-overflow errors in a recursive data-serialization algorithm may be deployed by manually loading the program code 107 directly into client, server, and proxy computers (not shown) by loading the program code 107 into a computer-readable storage medium (e.g., computer data storage device 111), program code 107 may also be automatically or semi-automatically deployed into computer system 101 by sending program code 107 to a central server (e.g., computer system 101) or to a group of central servers. Program code 107 may then be downloaded into client computers (not shown) that will execute program code 107.

Alternatively, program code 107 may be sent directly to the client computer via e-mail. Program code 107 may then either be detached to a directory on the client computer or loaded into a directory on the client computer by an e-mail option that selects a program that detaches program code 107 into the directory.

Another alternative is to send program code 107 directly to a directory on the client computer hard drive. If proxy servers are configured, the process selects the proxy server code, determines on which computers to place the proxy servers' code, transmits the proxy server code, and then installs the proxy server code on the proxy computer. Program code 107 is then transmitted to the proxy server and stored on the proxy server.

In one embodiment, program code 107 for a method for dynamic reduction of stack-overflow errors in a recursive data-serialization algorithm is integrated into a client, server and network environment by providing for program code 107 to coexist with software applications (not shown), operating systems (not shown) and network operating systems software (not shown) and then installing program code 107 on the clients and servers in the environment where program code 107 will function.

The first step of the aforementioned integration of code included in program code 107 is to identify any software on the clients and servers, including the network operating system (not shown), where program code 107 will be deployed that are required by program code 107 or that work in conjunction with program code 107. This identified software includes the network operating system, where the network operating system comprises software that enhances a basic operating system by adding networking features. Next, the software applications and version numbers are identified and compared to a list of software applications and correct version numbers that have been tested to work with program code 107. A software application that is missing or that does not match a correct version number is upgraded to the correct version.

A program instruction that passes parameters from program code 107 to a software application is checked to ensure that the instruction's parameter list matches a parameter list required by the program code 107. Conversely, a parameter passed by the software application to program code 107 is checked to ensure that the parameter matches a parameter required by program code 107. The client and server operating systems, including the network operating systems, are identified and compared to a list of operating systems, version numbers, and network software programs that have been tested to work with program code 107. An operating system, version number, or network software program that does not match an entry of the list of tested operating systems and version numbers is upgraded to the listed level on the client computers and upgraded to the listed level on the server computers.

After ensuring that the software, where program code 107 is to be deployed, is at a correct version level that has been tested to work with program code 107, the integration is completed by installing program code 107 on the clients and servers.

Embodiments of the present invention may be implemented as a method performed by a processor of a computer system, as a computer program product, as a computer system, or as a processor-performed process or service for supporting computer infrastructure.

Embodiments of the present invention are capable of serializing complex data objects that comprise data elements such as those known in the art as "subclasses" or "fields." These data objects may be organized into linked lists, tables, hierarchical or treelike structures like directed graphs, or in any other data structure capable of being serialized.

Each instance of a class of data object may comprise "primitive" data-bearing fields, which are stored by value, and "reference" fields, which store addresses of other object instances. Serializing such an instance may therefore comprise storing numerous fields of the instance, as well as the name of the instance's class, information about the structure of the instance, and all the data stored in the instance's primitive fields.

Consider, for example, a class User that is defined as:
class User
{
   public string LastName;
   public string FirstName;
   public DateTime BirthDate;
   public int AcctNumber;
   public int SS#Last4Dig;
}

An instance of this class for a user named Loretta Jones, born on Jan. 24, 1953, with account number 4001327, and whose social security number ends in 2209 might be serialized in any sort of linear stream of data. Serializing this object in JSON ("JavaScript Object Notation") representation would produce the following text string:
<User>
   <LastName>Jones</LastName>
   <FirstName>Loretta</FirstName>
   <BirthDate>1953/01/24</BirthDate>
   <AcctNumber>4001327</AcctNumber>
   <SS#Last4Dig>2209</SS#Last4Dig>
</User>

Many other serialization formats are possible, such as XML or any sort of proprietary linear data format desired by an implementer as a function the implementation-dependent constraints or goals. One example of such a simple proprietary format is:

<LN>Jones; <FN>Loretta; <BD>01/24/53; <Acct#4001327; <SS#4Dig>2209

Figure 2A:
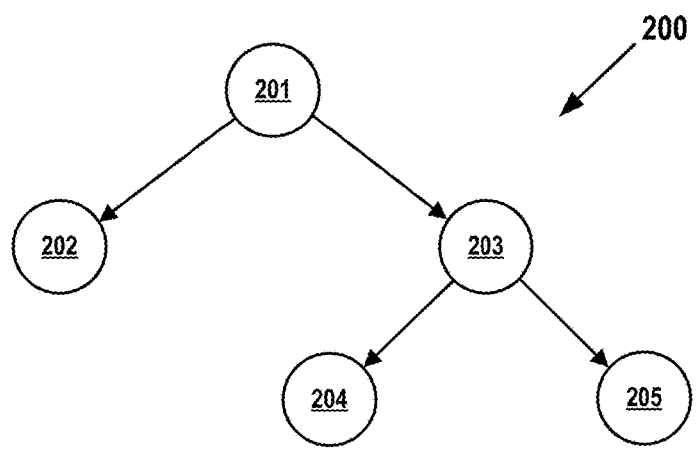
FIG. 2A is a first example of a data set that is capable of being serialized.

FIG. 2A shows another example of a data set that is capable of being serialized. In this example, the data set is a binary tree or directed graph 200, which consists of three levels. Level 1 contains root node 201, level 2 contains nodes 202 and 203, and level 3 three contains nodes 204 and 205. In this simple example, each node 201-204 contains only a self-identifier field.

In this example, a serialization algorithm might serialize this structure as a text string that traverses the tree 200 left-to-right level by level. Although most serialization algorithms begin serialization at a topmost serializable object or class in a hierarchy, serialization algorithms may traverse objects or classes on a same hierarchical level left-to-right, right-to-left, or in any other pattern that may accommodate a particular application.

Because each node of a binary tree may have zero, one, or two child nodes, the particular serialization algorithm of this example serializes a null value to represent a branch termination that occurs when a node has less than two child nodes.

Here, the serialization algorithm first serializes level-1 node 201 and then stores the two level-2 child nodes 202 and 203 of level-1 node 201. On level 3, the algorithm serializes two <null> nodes that represent the fact that node 202 has no child nodes, and then serializes the two child nodes 204 and 205 of second-level node 203.

The result is a serial-data string:

{201, 202, 203, <null>, <null>, 204, 205}.

Leaf nodes 204 and 205, which by definition do not have child nodes, each do not spawn a pair of <null> nodes because the structure of graph 200 may be represented without specifying that the rightmost nodes of the deepest level of the graph are leaf nodes. Other serialization algorithms may instead add <null> terminators for rightmost leaf nodes, and embodiments of the present invention are flexible enough to accommodate either convention.

The exact format of the serialized string is not an essential element of this example. Other serialization algorithms known in the art or selected by an implementer as a function of technical or business considerations may produce completely different serialized output or may traverse the graph 200 along different paths. In all cases, however, the serialization algorithm will have generated a stream of serial data that represents the content and structure of the graph 200 according to some predetermined convention.

Figure 2B:
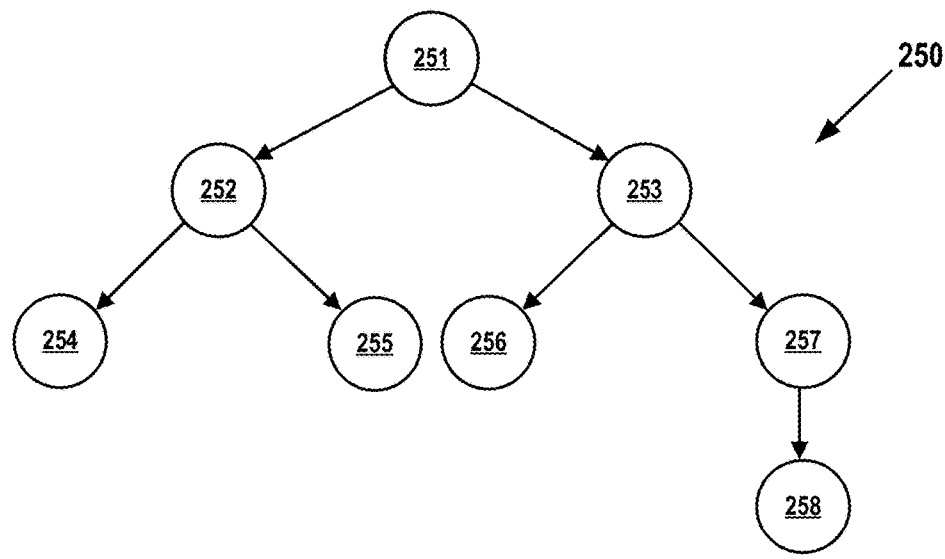
FIG. 2B is a second example of a data set that is capable of being serialized.

FIG. 2B is a second example of a data set that is capable of being serialized. Here, binary tree 250, in a manner similar to tree 200 of FIG. 2A, consists of four levels. Level 1 contains root node 251, level 2 contains nodes 252 and 253, level 3 three contains nodes 254-257, and level 4 contains node 258.

Using a serialization algorithm similar to that of FIG. 2A, serialization of tree 200 would yield the serial data stream:

{251, 252, 253, 254, 255, 256, 257, <null>, <null>, <null>, <null>, <null>, <null>, 258}.

Once a first object is serialized, the serialization engine may next attempt to serialize each object that is referenced by one of the first object's reference fields. This methodical approach helps the serialization engine avoid circular references and ensures that the same object is not serialized more than once. When the stored serialized data is deserialized by a converse procedure, the first object is restored as a properly structured instance of the object's class that includes all of the first object's data members.

A recursive serialization algorithm may fail to serialize a reference field of a first object because the reference field contains at most an address of a second data-storing object, not the second object's data itself. In such cases, restoring a serialized address of the second object at a later time would produce unreliable results if the second object is no longer stored at the address identified by the deserialized pointer. Serializing objects that comprise reference fields or dynamic metadata may therefore require a nonrecursive serialization algorithm.

Figure 3:
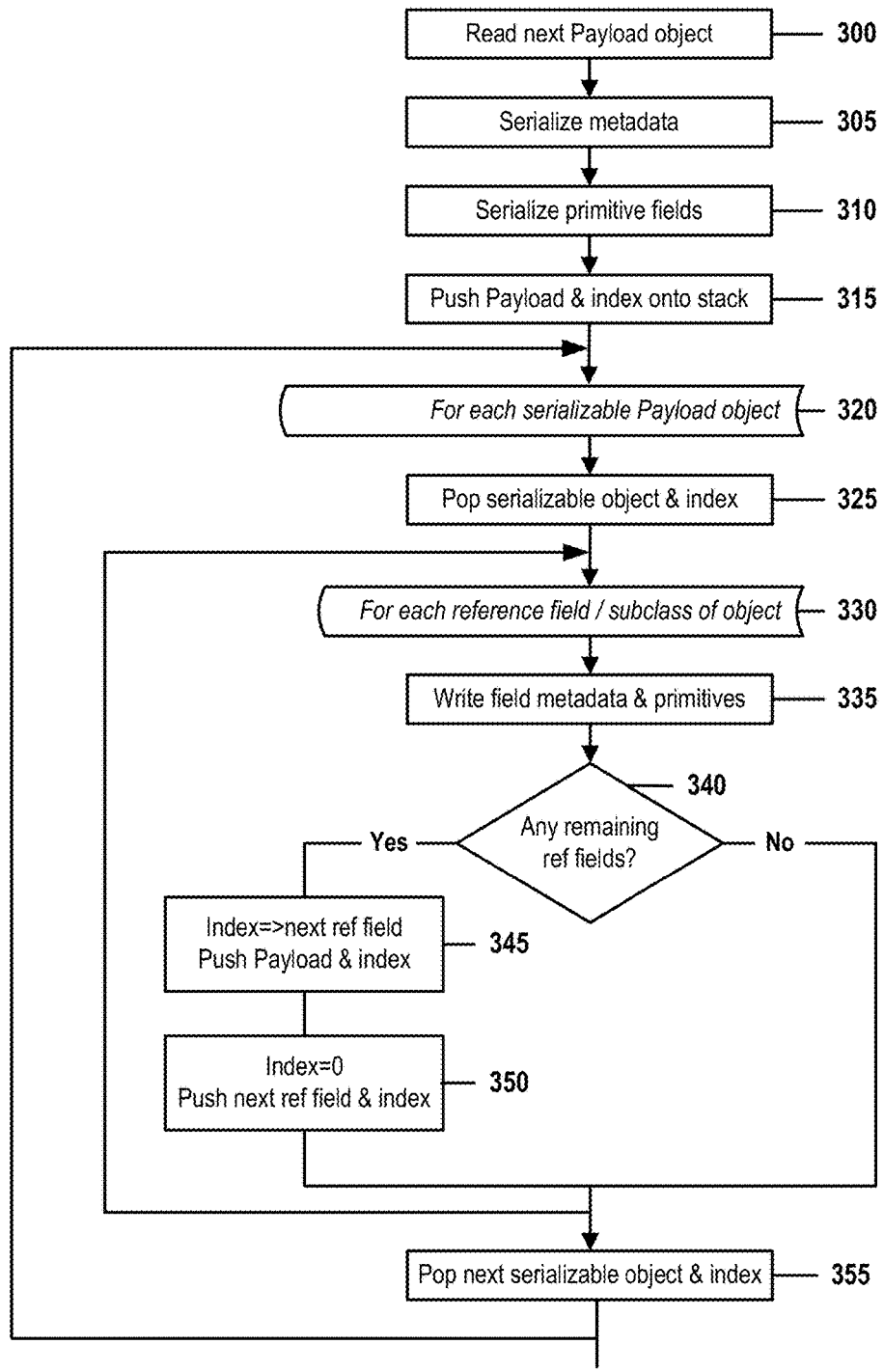
FIG. 3 is a flow chart that illustrates an example of a nonrecursive serialization algorithm.

FIG. 3 is a flow chart that illustrates an example of a nonrecursive serialization algorithm. FIG. 3 comprises steps 300-355.

Many types of nonrecursive serialization algorithms are known in the art. One class of algorithms that is common in modern data-serialization applications works by using a stack-like data structure for temporary storage.

When serializing a complex object that comprises reference fields (which point to other objects), or that is an instance of a class that comprises subclasses, a nonrecursive algorithms may first write certain components of the object, such as associated metadata or data-storing primitive fields, to a serial-data output stream, before pushing remaining reference fields to the stack-like data structure. In such cases, the algorithm may refer to the class definition associated with the object or with its fields in order to identify metadata or to distinguish between primitive fields and reference fields.

FIG. 3 illustrates such a nonrecursive procedure. In this example, a nonrecursive algorithm write_value serializes each object of a hierarchy of serializable objects, or each class of a hierarchy of nested classes and subclasses, by recursively calling itself as it traverses the hierarchy. As in previous examples, each serializable object will be referred to here as a "Payload," and the algorithm of FIG. 3 begins by serializing the uppermost Payload object in the hierarchy, or the uppermost instance of a Payload class of the set of nested classes and subclasses.

For example, a Payload object class that comprises two integer fields, a string field, and a reference field might be declared by the pseudocode:

public class Payload implements Serializable
    { private int intField=7;
        private String strField="test string";
        private long IntField=10;
        private Reference refField=new Reference( );
    }

The exemplary method of FIG. 3 also uses instances of a marker in order to keep track of which component of which object is currently being serialized. Each instance of this marker comprises an object to be serialized and an index that identifies a level, within the structure of the hierarchy, of the next object to be serialized. One possible declaration of this market is illustrated by the simple pseudocode:

class RecursionMarker {
        Serializable obj;
        int index;
    }

One example of a nonrecursive serialization algorithm is write_value:

(10a) public void write_value(Serializable object) throws IOException {
    (15a) write_MetaData(object);
    (20a) write_prmitiveFields(object);

(25a) RecursionMarker marker=new RecursionMarker (object, 0);
(30a) recursionMarkerStack.push(marker);
(35a) writeObjectLoop( );
}

In step 300 (and in line (10a) below), a nonrecursive serialization algorithm write_value receives identification of a serializable Payload object. This object may be a highest-level object of a hierarchy of objects and may be an instance an uppermost class of a hierarchical structure of classes and subclasses. In a general case, the Payload object received in this step may comprise both primitive and reference fields. The remainder of the method of FIG. 3 will serialize all component fields of this uppermost Payload object and all component fields of other lower-level objects that share with the uppermost Payload object a hierarchical structure like that shown in FIGS. 2A and 2B.

In step 305 and line (15a), write_value calls a first helper routine to serialize metadata associated with the current Payload. This procedure comprises using known methods to identify and store the metadata to the serial stream of data being written by the nonrecursive algorithm. Such metadata might, for example, comprise a name or characteristic of the current Payload's class, the Payload's SUID (a hash code used in the art to verify compatibility of the Payload class between different users), or descriptions of the Payload class's field names, field types, or superclass.

In step 310 and line (20a), write_value calls a second helper routine to serialize the contents of the primitive fields comprised by the current Payload. This procedure comprises using known methods to identify and store these values to the serial stream of data being written by the nonrecursive algorithm.

In step 315 and lines (25a)-(30a), write_value creates an instance of the RecursionMarker marker that comprises the current Payload object and an index of the next reference field of the current Payload object that needs to be serialized. In its initial iteration, in which the uppermost Payload object is serialized, this index is set to 0. This marker is then pushed onto a stack-like data structure that is used by the nonrecursive algorithm to pass information between routines. write_value then continues in line (35a) with routine writeObjectLoop( ):

(40a) private void writeObjectLoop( )
{
(45a) RecursionMarker marker=recursionMarkerStack.pop( );
(50a) while(marker 1=null) {
(55a) write_fieldsInNonRecursiveWay(marker.obj, marker.index);
(60a) marker=recursionMarkerStack.pop( );
}
}

In step 320 and lines (45a)-(55a), writeObjectLoop( ) retrieves the current Payload object and index from the top of the stack-like structure, and then initiates an outer iterative procedure that repeats once for each serializable object in the hierarchy (that is, until the outer iterative procedure is unable to pop any more markers from the stack-like structure).

Each iteration of the outer iterative procedure begins by calling routine write_fieldsInNonRecursiveWay to write each reference field in the current Payload object to the serialized output stream. When calling write_fieldsInNonRecursiveWay, writeObjectLoop( ) passes to write_fieldsInNonRecursiveWay the popped marker information (the Payload object currently being serialized and the index of the next reference field of the current Payload object to be serialized). After write_fieldsInNonRecursiveWay completes the task of serializing the current Payload, write_fieldsInNonRecursiveWay returns an updated marker to writeObjectLoop( ), where the returned marker identifies a next serializable Payload object and index.

write_fieldsInNonRecursiveWay may be performed by a routine similar to:

(65a) public void write_fieldsInNonRecursiveWay(Serializable object, int index){
(70a) Serializable[ ] fields=ObjectStreamClass.getReferenceFields(object)
(75a) for (int i=index; i<fields.length; i++){
(80a) write_MetaData(fields[i]);
(85a) write_prmitiveFields(fields[i]);
(90a) if (ObjectStreamClass.hasReferenceFields(fields[i]))
{
(95a) Recursionmarker marker=new RecursionMarker (object, i+1);
(100a) recursionMarkerStack.push(marker);
(110a) Recursionmarker fieldMarker=new RecursionMarker(fields[i], 0);
(120a) recursionMarkerStack.push(fieldMarker);
return;
}
}
return;
}

In step 325 and lines (60a)-(65a), write_fieldsInNonRecursiveWay receives from writeObjectLoop( ) a copy of the current Payload class and index, previously stored as the topmost marker of the stack-like structure. In this first iteration of the outer iterative procedure, the topmost marker contains the (uppermost) Payload object currently being serialized and an index to the next reference field of the current Payload to be serialized (initially set to 0). In line (70a), calls a helper routine to extract from the received Payload class a set of serializable fields of the current Payload.

In step 330 and line (75a), write_fieldsInNonRecursiveWay initiates an inner iterative procedure that is performed once for each field of the set of serializable fields of the current Payload. In other words, each iteration of this inner iterative procedure serializes a field that is at one level deeper than the parent Payload object passed to write_fieldsInNonRecursiveWay from writeObjectLoop( ).

In step 335 and lines (80a)-(85a), write_fieldsInNonRecursiveWay calls helper routines to serialize metadata for the field currently being processed by the inner iterative procedure; and further serializes a value of the current field if the current field is a primitive field.

In step 340 and line (90a), the inner iterative loop determines whether the Payload object currently being processed has any reference fields of its own that have not already been serialized. These reference fields, if they exist, will reside one level deeper than the current Payload object.

In step 345 and lines (95a)-(100a), if the inner iterative loop determined in step 340 that the Payload object currently being processed still comprises an unserialized reference field, then the current Payload is pushed onto the stack-like data structure, along with a new index value that identifies the next reference field of the Payload object that is to be serialized.

If, for example, the helper routine in line (90a), while processing the second field of the Payload object, determines that the third field of the current Payload object is a reference field, the nonrecursive algorithm in this step would create and push a marker that comprises the current Payload object and an index value of 3, which indicates that the next reference field to be serialized is the third field of the Payload object.

In step 350 and lines (110a)-(120a), the inner iterative loop of routine write_fieldsInNonRecursiveWay creates another new marker that comprises the reference field currently being processed and an index value of 0, and then pushes this marker onto the stack-like data structure. The 0 index value indicates that the marker identifies a new deeper level of the hierarchical structure being serialized. In our preceding example, this second marker would comprise the second field of the current Payload object and an index value of 0.

During the first pass through the nonrecursive algorithm, at the conclusion of step 350, the stack-like data structure would contain a set of pairs of markers. The first marker of each of these pairs comprises a copy of a reference field of the currently processed Payload and an index value of 0; and the second marker of each of these pairs comprises a copy of the current Payload object and an index value that identifies the next reference field of the current Payload object to be serialized.

At the conclusion of the final iteration of the inner iterative procedure of steps 340-350, routine write_fieldsInNonRecursiveWay ends and returns control to routine writeObjectLoop( ).

In step 355 and line (60a), routine writeObjectLoop( ) retrieves the most recent marker pushed to the stack. This marker identifies the next object to be serialized, which, in our running example, would be the reference field pushed to the stack in step 350. In the next iteration of the outer iterative procedure of writeObjectLoop( ), this next reference object will be passed to write_fieldsInNonRecursiveWay for as a new object for serialization, just as the original uppermost Payload object had been passed to write_fieldsInNonRecursiveWay for processing during the previous iteration.

In this manner, each field of the hierarchy is processed, with the outer iterative procedure terminating only when no more markers may be written to the stack-like data structure, allowing the inner procedure to empty the stack. At this point, all objects in the hierarchy will have been serialized to the output data stream.

Figure 5:
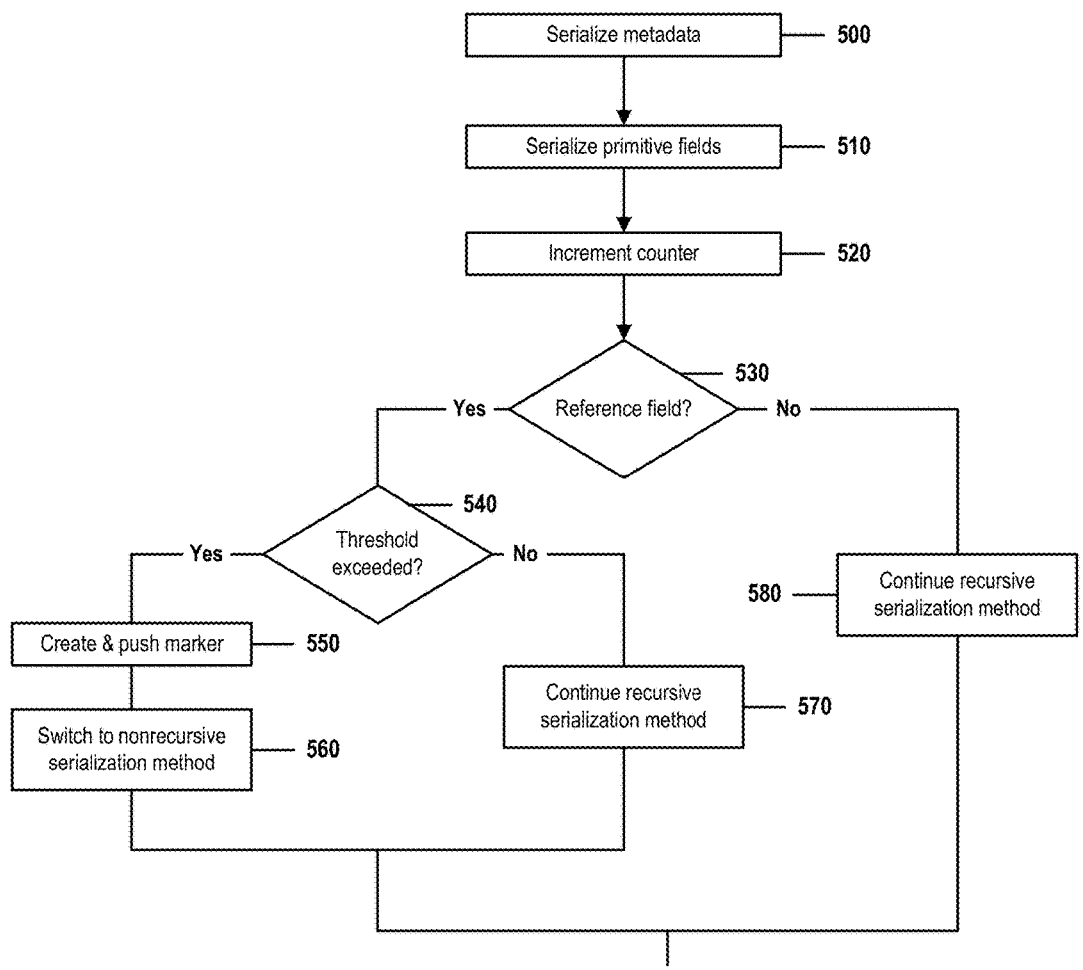
FIG. 5 is a flow chart that illustrates an embodiment of the present invention that dynamically switches between recursive and nonrecursive serialization mechanisms by using a static counter.
Figure 5A:
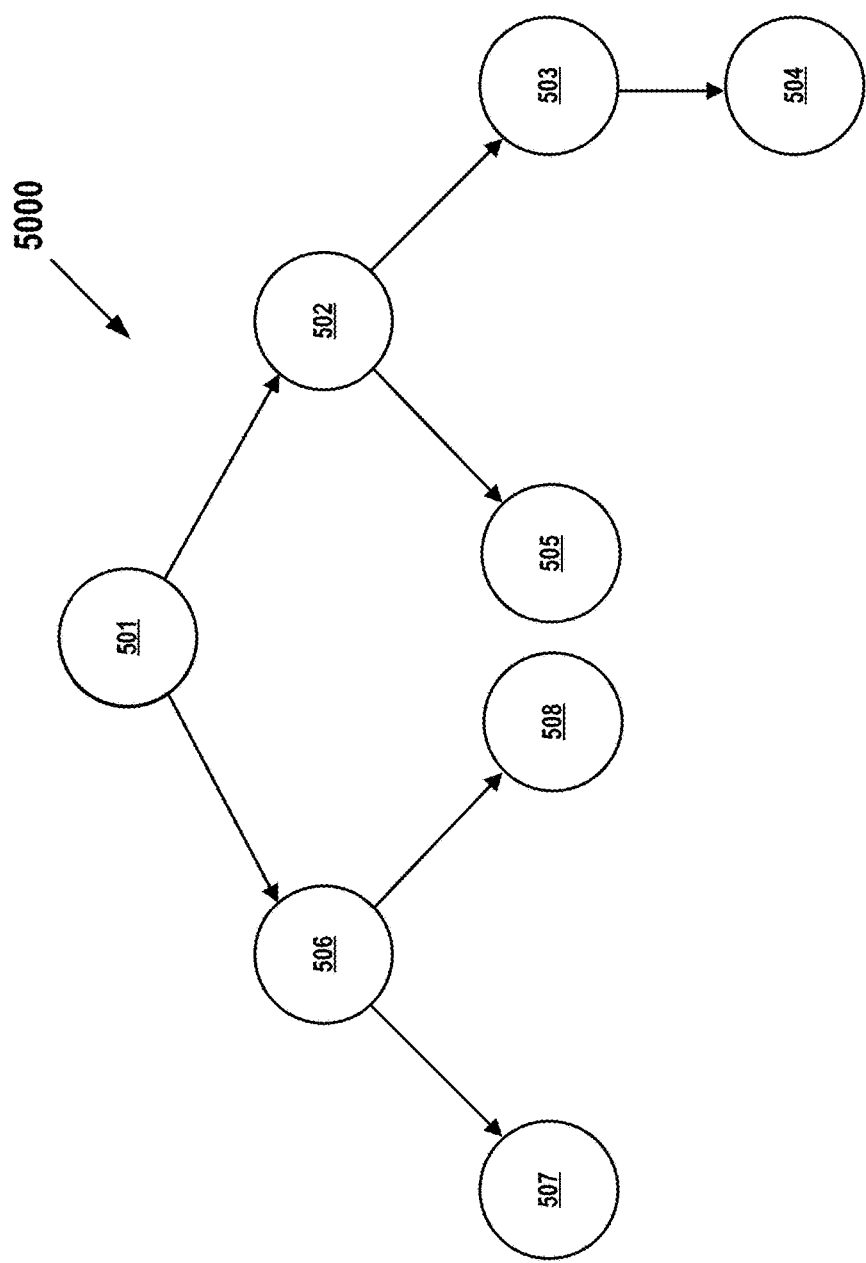
FIG. 5A shows a hierarchical data structure used in a concrete example of a serialization method of FIG. 5.

FIG. 5A, which illustrates an embodiments of the present invention, describes a concrete example of how a nonrecursive algorithm would process a complex class or data structure capable of being represented by a hierarchical graph similar to that of FIG. 2B.

Figure 4:
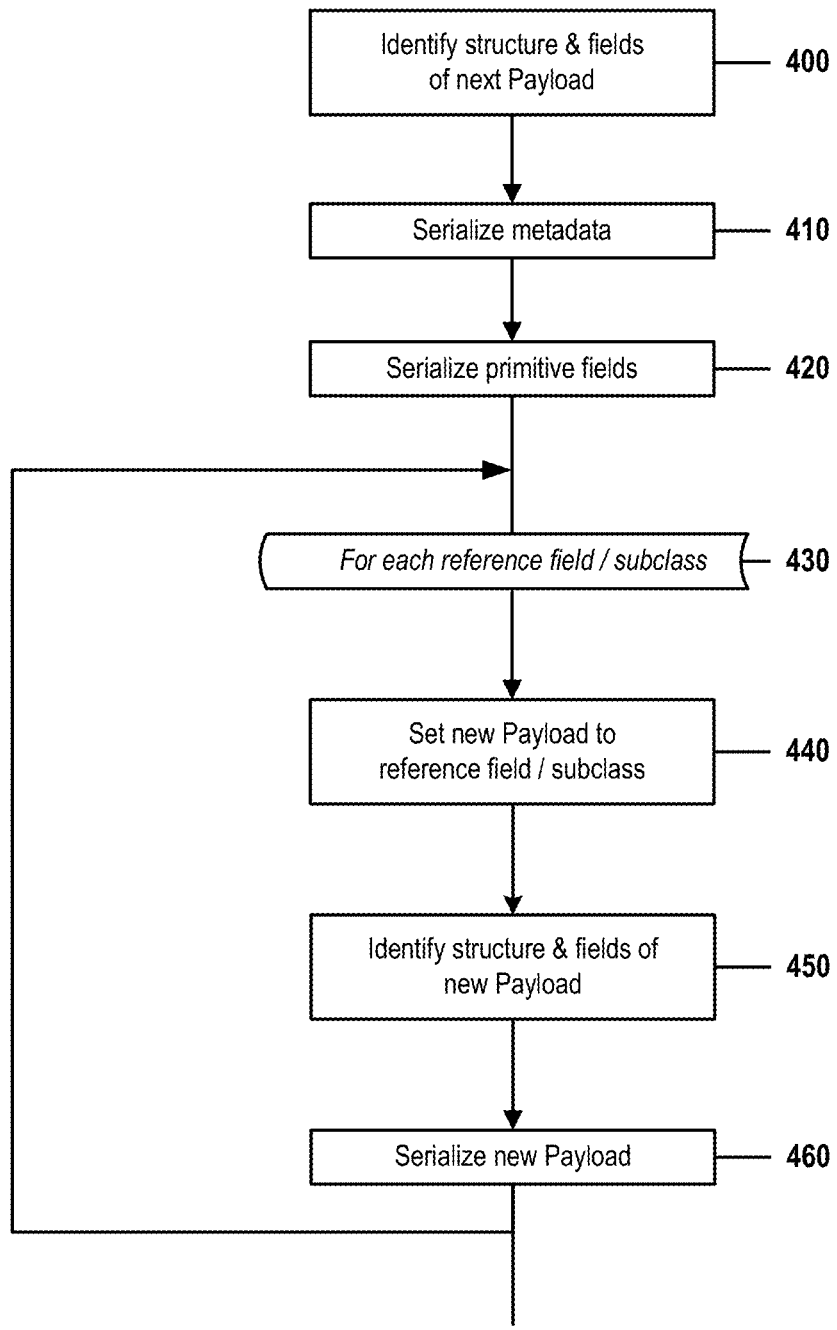
FIG. 4 is a flow chart that illustrates an example of a recursive serialization algorithm.

FIG. 4 is a flow chart that illustrates an example of a recursive serialization algorithm. FIG. 4 comprises steps 400-460.

FIG. 4 shows one possible implementation of such a recursive algorithm, logically represented here by pseudo-code routine write_value:

(10b) public void write_value(Serializable object)
(15b) {
(20b) write_MetaData(object);
(25b) write_primitiveFields(object);
(30b) write_fieldsInRecursiveWay(object);
(35b) }

In this example, write_value serializes each object of a hierarchy of serializable objects, or each class of a hierarchy of nested classes and subclasses, by recursively calling itself as it traverses the hierarchy. As in previous examples, each serializable entity will be referred to here as a "Payload," and the algorithm of FIG. 4 begins by serializing the uppermost Payload object in the hierarchy, or the uppermost Payload class of the set of nested classes and subclasses.

In step 400, the method of FIG. 4 identifies the uppermost Payload and the uppermost Payload's internal structure, metadata, or other characteristics. This step may be performed by any means known in the art, such as by examining a declaration of a Payload class, where the uppermost Payload is an instance of the Payload class.

In step 410 (and line (20b) above), the method of FIG. 4 begins serializing the current serializable Payload by calling a write_MetaData routine to write metadata associated with the Payload to a serialized output data stream. Methods of performing this step are known in the art and may be selected as necessary to accommodate any implementation-dependent constraints.

In step 420 and line (25b), the algorithm calls a write_primitiveFields routine to write the primitive fields of the current Payload to the serialized output data stream. Again, methods of performing this step are known in the art and may be selected as necessary to accommodate any implementation-dependent constraints.

In step 430 and line (30b), the write_value algorithm initiates an iterative procedure of steps 430-460 by calling recursive routine write_fieldsInRecursiveWay. Each iteration of this recursive procedure serializes a reference field or subclass of the Payload currently being serialized by write_value. Because write_fieldsInRecursiveWay is a recursive routine, write_fieldsInRecursiveWay will recursively call itself by calling the write_value routine that initially called write_fieldsInRecursiveWay. In the first iteration of the iterative procedure of steps 430-460, the iterative procedure processes the first reference field or subclass of the uppermost Payload previously processed in steps 400-420.

Each performance of write_fieldsInRecursiveWay processes an object or class identified by a reference field as though that object or class is a new, lower-level Payload. write_fieldsInRecursiveWay then calls write_value to begin serializing the new Payload. As before, write_value serializes metadata and primitive fields of the new Payload and, when encountering a reference field or subclass of the new Payload, again calls write_fieldsInRecursiveWay to serialize the newly encountered reference field or subclass at yet a deeper level of nesting.

The iterative procedure continues in this way until all fields or subclasses of all Payloads of the hierarchy have been serialized. As is known in the field of computer programming, such recursive algorithms may keep track of system states across recursive iterations by temporarily storing frames of data on a persistent stack data structure.

One possible implementation of write_fieldsInRecursiveWay is:

(40b) public void write_fieldsInRecursiveWay (Serializable object)
(45b) {
(50b) Fields[ ] fields=ObjectStreamClass.getReferenceFields (object.getClass( ))
(55b) for (Field field:fields)
(60b) {
(65b) write_value(field);
(70b) }
(75b) }

In step 440 and line (40b), write_fieldsInRecursiveWay sets the reference field passed as a parameter from the most previous of write_value as a new Payload. The remaining steps of the current iteration of the iterative procedure of steps 430-460 will thus treat this passed reference field as a current Payload.

In step 450 and line (50b), the system identifies the fields, metadata, and other information associated with the new, current Payload object. This step may be performed by means analogous to those of step 400 and, as with other steps of the method of FIG. 4, step 450 may be performed by any means known in the art, such as by analyzing a class declaration of the current Payload.

During the first iteration of the procedure of steps 430-460, step 440 will retrieve information about the first-encountered reference field of the uppermost Payload. By convention, the uppermost Payload may be considered to occupy level 1 of the hierarchy, the first reference field may be considered to occupy level 2 of the hierarchy, and the primitive fields and reference fields comprised by the first reference field may be considered to occupy level 3. The retrieved information will thus identify level-3 metadata, primitive fields, and reference fields comprised by the level-2 first reference field of the uppermost, level-1, Payload. Subsequent iterations of the iterative procedure may process analogous entities at deeper levels of the hierarchy.

In step 460 and line (65b), write_fieldsInRecursiveWay recursively calls routine write_value to begin serializing the current Payload. write_value will, as before, serialize the metadata and primitive fields of the current Payload and, when write_value encounters a reference field of the current Payload, will again call write_fieldsInRecursiveWay to process this new, more deeply nested reference field. In embodiments and examples of FIG. 4, the entire recursive procedure initiated in step 460 comprises steps 410-460. Recursion occurs because step 460 indirectly calls itself.

The method of FIG. 4 will continue in this way until all Payloads of the hierarchical structure have been serialized, recursively calling itself to serialize Payloads that reside more and more deeply within the hierarchical structure.

Recursive serialization algorithms like the method of FIG. 4 must interrupt a serialization of a Payload every time that the algorithm encounters a reference field of the Payload. This interruption comprises calling write_fieldsInRecursiveWay to begin processing fields or subclasses nested within the reference field of the Payload. Because it is possible for a large number of such interruptions to occur in the course of a serialization, such recursive algorithms store a current system state of each interrupted serialization before beginning to serialize a next Payload. The most common means of storing such a state is as a frame of a fixed-size stack data structure.

In many real-world applications, a hierarchy of Payloads may comprise so many nested levels that the algorithm's stack is not large enough to store all the required frames. In such cases, a stack-overflow error occurs and the serialization fails.

Embodiments of the present invention do not fundamentally revise the basic concept or implementation methods of recursive serialization algorithms based on fixed-size stack data structures. Embodiments instead provide means for determining when a stack-overflow error is imminent or likely and respond by automatically switching a serialization procedure to a lower-performance or higher-overhead non-recursive procedure until a recursive algorithm may be resumed without risk of an error condition.

FIG. 5 is a flow chart that illustrates an embodiment of the present invention that dynamically switches between recursive and nonrecursive serialization mechanisms by using a static counter. FIG. 5 comprises steps 500-580.

Methods of this embodiment determine that a recursive serialization algorithm should switch to a nonrecursive algorithm when a scalar counter write_count reaches a threshold value RECURSIVE_THRESHOLD. This may be performed by methods similar to those described by FIG. 5 and to the novel version of routine write_value below:

```
(10c) public void write_value(Serializable object) {
(15c)   write_MetaData(object);
(20c)   write_primitiveFields (object);
(25c)   write_count++;
(30c)   if(hasReferenceFields (object)) {
(35c)     if(write_count<=RECURSIVE_THRESHOLD) {
(40c)       write_fieldsInRecursiveWay (object);
          } else {
(45c)       Recursionmarker marker=new RecursionMarker
              (object, 0);
(50c)       recursionMarkerStack.push(marker);
(55c)       writeObjectLoop ( );
          }
        }
(60c)   write_count-;
      }
```

In steps 500 and 510, recursive serialization algorithm write_value begins serializing objects of a hierarchical data structure. It starts with a first, uppermost, Payload object, using a procedure similar to that of the recursive algorithm of FIG. 4. Step 500 and line (15c) serializes metadata of the current Payload class and step 510 and line (20c) serialize values of primitive fields or subclasses of the current Payload class.

In step 520 and line (25c), the algorithm increments the static counter write_count to indicate that the metadata and primitive fields of an object have been serialized. This counter will be compared to the threshold before starting serialization of every object in the graph. If it finds that the scalar counter has crossed the threshold then the algorithm will infer that an unacceptable number of objects have been pushed to the stack and will switch to nonrecursive mode, where serialization of the current object will continue.

In step 530 and line (30c), the algorithm determines whether the Payload object currently being serialized contains any reference fields (or subclasses). If it does, the algorithm continues with steps 540-570. If the field contains no reference fields, the algorithm instead proceeds with step 580.

In step 580, the algorithm continues serializing Payload objects of the hierarchical data structure by means of the recursive method, in a manner similar to that of the method of FIG. 4.

In step 540 and line (35c), after determining that the current Payload does contain at least one reference field, the algorithm determines whether the static counter write_count has exceeded a threshold value RECURSIVE_THRESHOLD. A determination that the counter has exceeded the threshold results in a further determination that an excessive number of objects are stored on the stack and that there is a possibility that the recursive algorithm may soon produce a stack-overflow error.

If the algorithm in step 540 and line (35c) determines that the static counter has not exceeded the threshold value, then the algorithm continues in step 570 and line (40c) serializing the hierarchical data structure via a known method of recursion, such as the one described in FIG. 4.

If the algorithm in step 540 and line (35c) determines that the static counter has exceeded the threshold value, then the algorithm in step 550 and lines (45c)-(50c) creates a marker and pushes the marker onto a stack-like data structure in a manner analogous to that of lines (25a)-(30a) and step 315 of FIG. 3.

This new marker, like the marker in step 315, comprises a copy of the Payload object currently being serialized and an index value equal to 0. In this, and other nonrecursive algorithms described in this patent, markers are used to identify a Payload object, class, field, subclass, or other type of object that is to be serialized next. Each marker currently on the stack identifies one such object that the algorithm will at some point revisit in order to continue writing all remaining reference fields comprised by that object.

In step 560 and line (55c), the algorithm switches to a nonrecursive serialization procedure by calling a module writeObjectLoop( ). This procedure is analogous to similar steps 30a-120a of the nonrecursive algorithm described in FIG. 3. In FIG. 5, the serialization of the hierarchy of Payload-class objects continues in a nonrecursive manner.

In line (60c), the counter is decremented to represent that an object has been completely serialized and no markers remain on the stack to indicate that a field or subclass of that object are yet to be serialized.

The procedure of FIG. 5 may be illustrated by an example based on a task of serializing the Payload objects comprised by the graph data structure 5000 of FIG. 5A. Here, each object or class of the first two levels of the graph 501, 502, and 506, comprises two lower-level reference fields. Object 501, for example, comprises reference fields 502 and 506 and object 502 comprise reference fields 503 and 505. In this example, objects 501-508 are to be serialized in an order corresponding to the objects' numeric labeling.

Threshold value RECURSIVE_THRESHOLD is initialized to an arbitrary value of 1. Implementers are free to select any initial threshold value, based on an implementer's design or performance goals or on characteristics of the hardware or software used to implement an algorithm. A threshold value may, for example, be derived empirically by observing how effectively different thresholds prevent stack-overflow errors. In another example, a threshold may be selected as a function of a longest expected path of hierarchical structures being serialized.

The algorithm begins by writing metadata and primitive fields of uppermost Payload object 501, and then incrementing the write_count counter to a value of 1. The algorithm then determines that level-1 object 501 comprises one or more as-yet-unserialized level-2 reference fields and that the counter has not exceeded the threshold value of 1. Accordingly, the algorithm calls routine write_fieldsInRecursiveWay( ) in order to continue serializing recursively.

write_fieldsInRecursiveWay( ), as in methods of FIG. 4, loops through each reference field of object 501, recursively calling routine write_value( ) for each field. When write_value( ) processes reference field 502 (the first reference field of uppermost object 501), the counter is incremented to a value of 2, thus exceeding the threshold value.

The algorithm responds in line (45c) by creating a RecursionMarker that comprises the reference field 502 currently being serialized by write_value( ) and an index value of 0, indicating that field 502 will be the first reference field to be serialized at a new level (here, level 2). The algorithm then pushes this marker to the stack as a first frame, resulting in a stack structure:

| OBJECT 502 | INDEX = 0 |
|---|---|

As in the nonrecursive algorithm of FIG. 3, the serialization algorithm then calls routine writeObjectLoop( ) in line (55c), which pops the Recursionmarker from the stack and in turn passes popped arguments object 502 and an index value of 0 to nonrecursive routine write_fieldsInNonRecursiveWay( ).

As the method of FIG. 3, write_fieldsInNonRecursiveWay( ) retrieves the reference fields of object 502 and begins looping from the popped index value of 0. The algorithm then proceeds to serialize the first level-3 reference field 503 of level-2 reference field 502, writing metadata and primitive fields of the field 503.

After determining that field 503 comprises a reference field 504, write_fieldsInNonRecursiveWay( ) then creates and pushes two additional markers in the recursion stack and then returns to its calling routine writeObjectLoop( ).

| OBJECT 503 | INDEX = 0 |
|---|---|
| OBJECT 502 | INDEX = 1 | writeObjectLoop( ) pops the marker from the recursion stack, retrieving level-3 reference field 503 and index value 0, and then passes these parameters as arguments to a new instance of routine write_fieldsInNonRecursiveWay( ). This leaves the stack with only one remaining frame:

| OBJECT 502 | INDEX = 1 |
|---|---|

Continuing this method, write_fieldsInNonRecursiveWay( ) then retrieves the level-4 reference field 504 of level-3 reference field 503, writes metadata and primitive fields of field 504, and determines whether field 504 comprises any level-5 reference fields.

Since field 504 comprises no reference fields of its own, write_fieldsInNonRecursiveWay( ) returns control to writeObjectLoop( ), which pops the last remaining marker from the stack and again calls write_fieldsInNonRecursiveWay( ), this time with arguments object 502 and index 1. As before, and as in the method of FIG. 4, continues to serializes the reference fields of object 502, this time starting from index 1, indicating that write_fieldsInNonRecursiveWay( ) should begin serializing the second reference field 505 of object 502.

When the algorithm has finished writing metadata and primitive fields of lowest-level field 504, the system determines that field 504 has no lower-level reference fields of its own and returns control to routine writeObjectLoop( ). Because the stack is now empty, control returns to routine write_value, which decrements counter write_count to a value of 1.

This procedure continues in this manner until all objects have been serialized.

Figure 6:
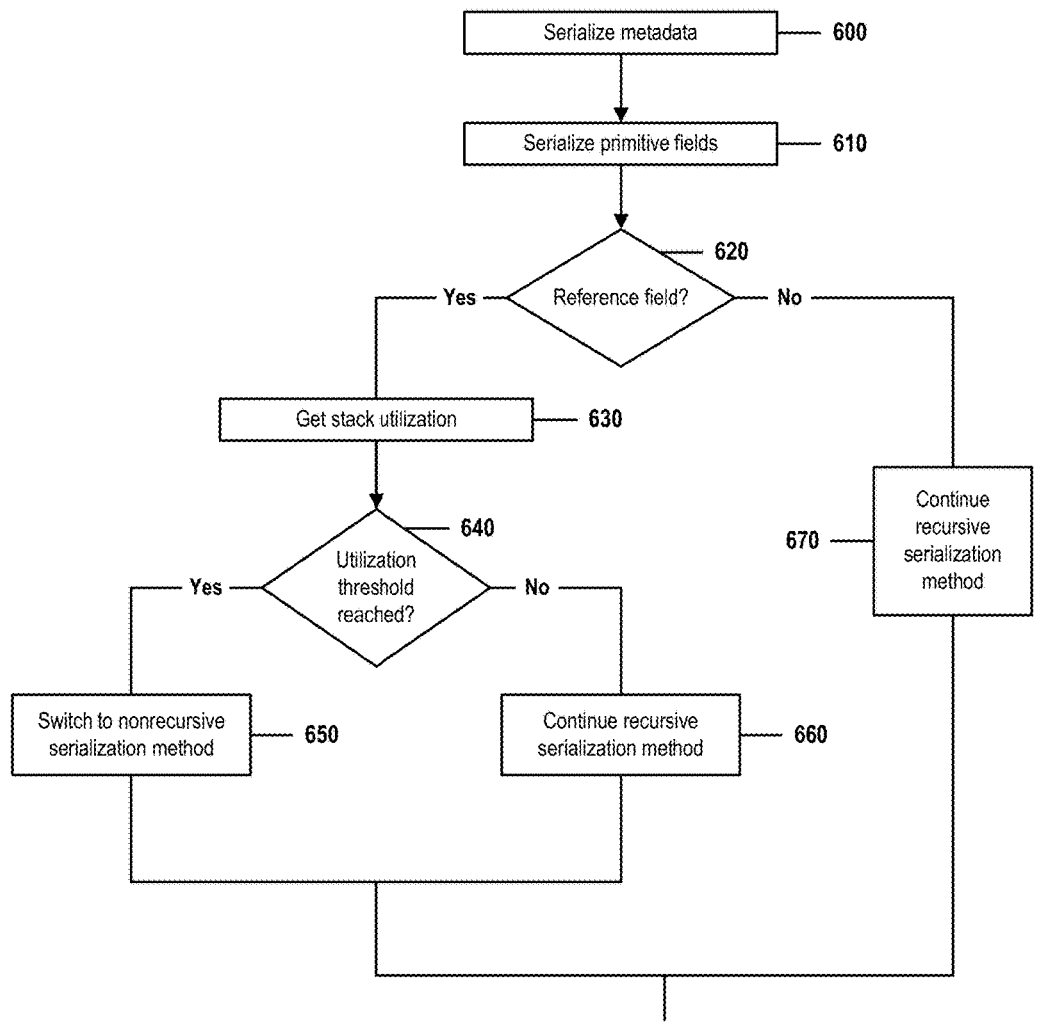
FIG. 6 is a flow chart that describes an embodiment of the present invention that dynamically switches between recursive and nonrecursive serialization mechanisms by using a method of poll stack utilization.

FIG. 6 is a flow chart that describes an embodiment of the present invention that dynamically switches between recursive and nonrecursive serialization mechanisms by using a method of poll stack utilization. FIG. 6 comprises steps 600-660.

The method of FIG. 6 comprises a serialization algorithm that calls a helper routine that returns a utilization level of a stack used by the algorithm to store marker-like objects or other representations of system states in a manner similar to that of FIG. 4. This method then uses the returned utilization value to decide whether to switch from a recursive algorithm to a nonrecursive algorithm. For example, in one implementation, the algorithm be programmed to switch from recursive serialization to nonrecursive serialization when it the algorithm determines that the stack is 90% full.

This helper routine may be identified, selected, or configured by any means known in the art. The routine may, for example, be implemented through API calls or system calls capable of returning utilization or unused-capacity figures for a data structure, or may be implemented as a stackutilization( ) call to a runtime environment, such as the Java Virtual Machine, within which the serialization algorithm is operating.

One possible implementation of a version of serialization algorithm write_value capable of implementing this method is:

```
(10d) public void write_value(Serializable object) {
(15d)   write_MetaData (object);
(20d)   write_primitiveFields (object);
(25d)   if(hasReferenceFields (object)) {
(30d)     int utilization=Thread.stackUtilization( );
(35d)     if(utilization<=RECURSIVE_THRESHOLD) {
(40d)       write_fieldsInRecursiveWay(object);
(45d)     } else {
(50d)       Recursionmarker marker=new RecursionMarker
              (object, 0);
(55d)       recursionMarkerStack.push(marker);
(60d)       writeObjectLoop( );
          }
        }
      }
```

As in previously described embodiments, write_value here begins by recursively serializing an uppermost Payload object of a hierarchical structure. Steps 600-610 and lines (15d)-(20d) serialize metadata and primitive fields of the uppermost remaining Payload.

In step 620 and line (25d), the algorithm determines whether the current Payload comprises reference fields at the next level. During, for example, the first iteration of a method of FIG. 6, write_value might begin to serialize the uppermost, level-1, Payload object or class of the hierarchy in steps 600-610. In this example, step 620 would determine whether any of the level-2 fields comprised by the currently serializing, level-1 Payload are reference fields. As with previously discussed embodiments and examples, a discovery here of lower-level reference fields would result in performance of a recursive procedure write_fieldsInRecursiveWay.

If the algorithm in step 620 determines that the current Payload does not comprise a reference field, then the algorithm performs step 670 in order to continue performing the current recursive method in a manner similar to that of FIG. 4. Proceeding in this way does not increase a risk of a stack-overflow error because the recursive algorithm does not need to push additional frames onto the stack in order to serialize fields that do not lie at a lower level.

If the algorithm in step 620 determines that the current Payload does one or more unserialized reference fields, then the algorithm continues with steps 630-660.

In step 630, the algorithm determines current utilization of the stack data structure through any means known in the art, including those mentioned above. In effect the method of FIG. 6 polls the stack for utilization figures every time an object (including lower-level reference fields of another object) is about to be serialized.

In step 640 and line (30d), the serialization mechanism determines whether stack utilization has exceeded a threshold value. As in the method of FIG. 5, this threshold value may be determined by any means known in the art, such as by means of empirical observations of the performance of the serialization mechanism with different threshold values, by considering hardware or software technical constraints, as a function of a business goal of the implementation, or as a function of the longest expected path from root to node in a hierarchical structure being serialized.

If the serialization system in step 640 determines that stack utilization has exceeded the threshold value, then the system switches to a nonrecursive serialization algorithm in step 650 and lines (50d)-(60d).

If the serialization system in step 640 determines that stack utilization has not exceeded the threshold value, then the system continues serializing the reference field by means of a recursive serialization algorithm in step 660 and line (40d).

Embodiments of the method of FIG. 6 may be enhanced or optimized by implanting any of several optional features. The method may run more efficiently if the algorithm queries stack utilization only when beginning to serialize a new Payload object, rather than querying utilization for every reference field of every object. This optimization may, for example, reduce the number of utilization queries for an object that comprises three reference fields from four queries (once for the object itself and once for each of the three fields) to one query.

In other embodiments, if the algorithm determines that stack utilization is well below a threshold value, then the algorithm could automatically reduce the frequency at which it queries utilization. For example, if an implementation detects 60% current utilization, which is far below a threshold set to 95%, the system might begin querying utilization once for every 100 serializable objects instead of querying the information for every object. In such cases, the system might revert to its original every-object querying frequency after a certain duration of time has elapsed or when it identifies a current utilization figure that is within a specified range of values approaching the 95% threshold.

In yet other embodiments, stack utilization might be queried only at when about to serialize the first, top-level, object of the hierarchy. The algorithm, using known information about the software or hardware by which the algorithm is implemented, might then compute utilization internally by tracking the number and size of frames that the algorithm pushes to and pops from the stack.

Many other similar optimization methods are within the scope of the present invention.

Figure 7:
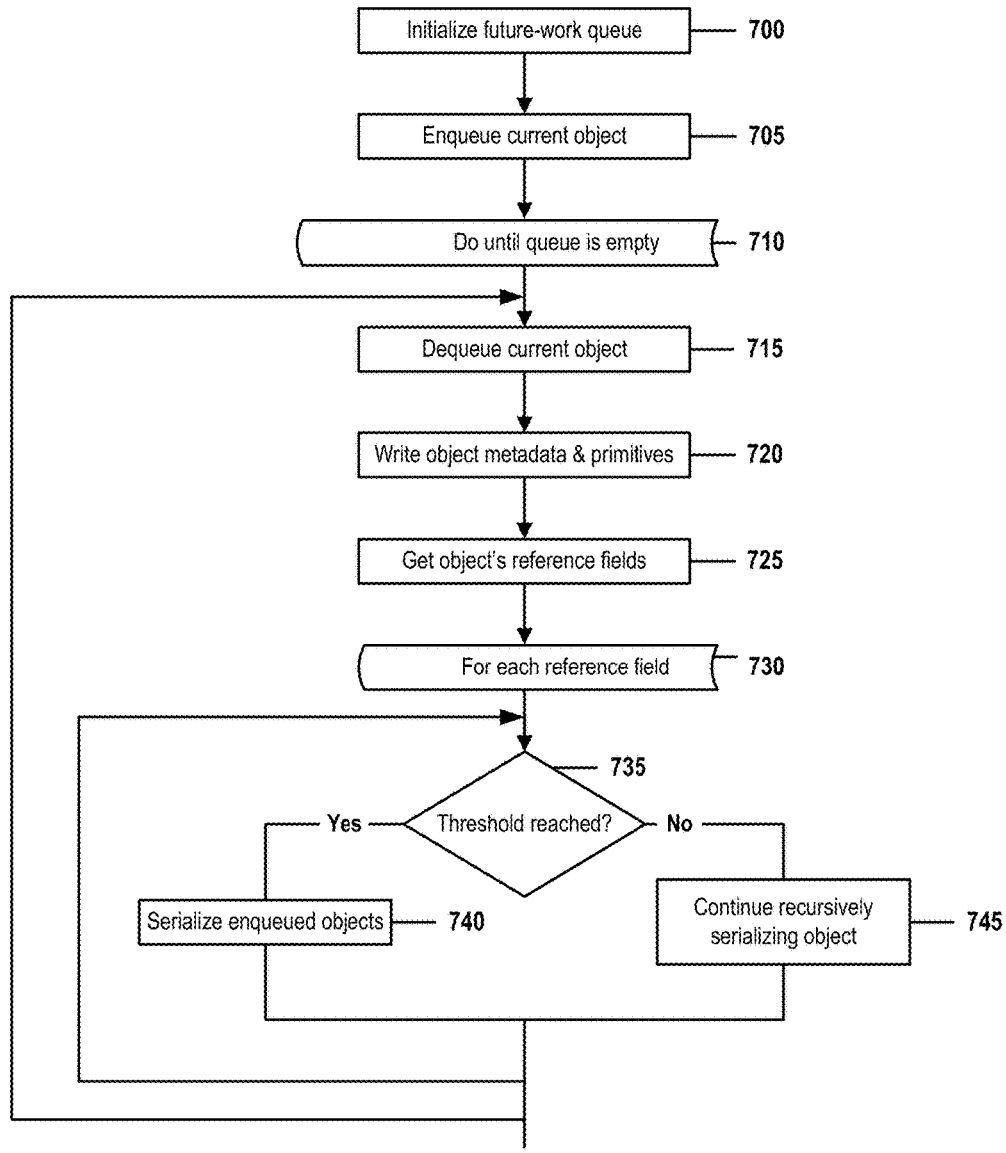
FIG. 7 is a flow chart that describes an embodiment of the present invention that dynamically offloads portions of stored stack data to a future-work queue.

FIG. 7 is a flow chart that describes an embodiment of the present invention that dynamically offloads portions of stored stack data to a future-work queue. FIG. 7 comprises steps 700-745.

In this embodiment, a recursive serialization algorithm unwinds (or pops partially serialized stored objects from) its internal-storage call stack when a certain condition is met, instead using a variable-size, queue-like data structure to finish serializing the serializable objects or fields. Unlike other embodiments and examples described in this application, detection of the condition may not trigger a switch to a nonrecursive algorithm.

This method may thus be combined with other embodiments by modifying those other embodiments to respond to a satisfaction of a threshold condition by temporarily using a queue-like data structure to serialize objects, rather than switching to a nonrecursive method. Such modified embodiments may allow a higher-performance recursive serialization method to continue to operate. even if a threshold condition has been detected.

One example of a recursive algorithm capable of implementing the embodiment of FIG. 7 is represented by the pseudocode routine serialize and in the subroutines called by routine serialize:

```
(10e)public void serialize(Serializable obj ) {
(15e)boolean unwindAllWhenReachedThreshold = false;
(20e)Queue futureWorkQ = new Queue( );
(25e)futureWorkQ.add(new RecursionMarker (object,-1));
(30e)while (futureWork.notEmpty) {
(35e)    unwindAllWhenReachedThreshold = false;
(40e)    Recursionmarker marker = futureWorkQ.remove( );
(45e)    Serializable object = marker.obj;
(50e)    int index = marker.index;
(55e)    write_value(object, index);
     }
}
(60e)public void write_value(Serializable object, int index) {
(65e)if(index == −1) {
(70e)    write_MetaData(object);
(75e)    write_primitiveFields (object);
(80e)    index = index + 1;
      }
(85e)write_fieldsInRecursiveWay (object, index);
     }
(90e)public void write_fieldsInRecursiveWay (Serializable object, int index) {
(95e)  Fields[ ] fields = class_desc.getReferenceFields (object.getClass( ) );
(100e)  for(int i = index; i < fields.length; i++){
(105e)     if(unwindAllWhenReachedThreshold == true) {
(110e)       Recursionmarker marker = new RecursionMarker (object, i + 1);
(115e)       futureWorkQ.add(marker);
(120e)       return;
(125e)     } else {
(130e)       if(Thread.stackUtilization ( ) < RECURSIVE_THRESHOLD) {
(135e)         write_value(field, −1);
(140e)       } else {
(145e)         unwindAllWhenReachedThreshold = true;
(150e)         Recursionmarker marker = new RecursionMarker (object, i);
(155e)         futureWorkQadd(marker);
(160e)         return;
          }
       }
    }
}
```

In this example, recursive routine serialize( ) begins by adding an object to be serialized to a queue-like future-work queue (or queue-like data structure) futureWorkQ and then iteratively calls recursive routine write_value( ) until all components of the object have been processed. Each iteration of write_value( ) serializes a queued object's metadata and primitive fields and then calls recursive routine write_fieldsInRecursiveWay to serialize the object's lower-level reference fields by means of a recursive method similar to those described in preceding figures.

If a condition occurs during this process that indicates a likelihood of a stack-overflow error, write_fieldsInRecursiveWay serializes fields of each object remaining in the queue and then returns control to serialize( ). serialize( ) then, along with the recursive routines it calls, continues in this manner to recursively serialize each remaining object that has not yet been serialized.

The procedure of FIG. 7 starts with step 700 and line (10e) above, which launch routine serialize( ) to begin serializing a serializable object. Lines (10e)-(20e) initialize the future-work queue data structure that will store serializable objects when a condition occurs indicating that a stack-overflow error is likely to occur if the recursive algorithm continues to use a stack to store system states when serializing a hierarchy of serializable objects.

In step 705 and line (25e), the algorithm adds the object currently being serialized to the future work queue. As in previous examples, the object is added as a component of a marker data structure that also includes an index value. Here, the index is initially set to a value of −1 to indicate that metadata and primitive values of the current object have not yet been serialized.

Step 710 begins an outer iterative procedure of steps 710-745 that repeats until the future-work queue has been emptied out. This outer iterative procedure must be performed at least once because serialize( ) in line (25e) has seeded the future-work queue with a marker that identifies the initial serializable object, along with an index of −1.

In step 715 and line (40e), the system dequeues the most recently queued object, passing the marker in lines (45e)-(55e) to recursive routine write_value( ).

In step 720 and lines (60e)-(80e), because write_value( ) received an index-value parameter of −1, write_value( ) serializes the metadata and primitive fields of the current object. write_value( ) then increments the marker value (here, to a value of 0) to indicate that the current object's metadata and primitives do not need to be serialized again.

In step 725 and line (85e)-(90e), write_value( ) then calls the write_fieldsInRecursiveWay( ) routine to serialize any reference fields of the current serializable object. In line (95e), write_fieldsInRecursiveWay( ) begins this procedure by calling a helper routine to return a list of the reference fields comprised by the current object.

Step 730 and line (100e) begin an inner iterative procedure of steps 730-745 that is performed once for each reference field of the current serializable object. Each iteration of this inner iterative procedure attempts to serialize all fields and metadata of the lower-level object identified by the current reference field.

In step 735, the write_fieldsInRecursiveWay( ) determines whether a threshold condition has been satisfied. This threshold condition may comprise any of the conditions described in FIGS. 6 and 7. In the example described here, a threshold condition comprises testing a state of a binary flag variable unwindAllWhenReachedThreshold and by comparing current stack utilization to a threshold value. As in step 640 of FIG. 6, current stack utilization may be identified by any means known in the art and the threshold utilization value may be selected by empirical means, as a function of an implementer's expert knowledge of computer hardware or software, or by any other means known in the art.

If write_fieldsInRecursiveWay( ) determines in step 735 that the threshold condition has not been satisfied, the system in step 745 and lines (130e)-(135e) continues to perform a recursive data-serialization procedure similar to that described in earlier examples and embodiments by recursively calling write_value( ).

Here write_fieldsInRecursiveWay( ) passes to write_value( ): i) the reference field currently being processed by the inner iterative procedure of steps 730-745, and ii) an index value set to −1. As before, the −1 index value ensures that write_value( ) will serialize metadata and primitive fields of the passed reference field and recursively call write_fieldsInRecursiveWay( ) to serialize a next-deeper level of reference fields comprised by the passed reference field.

If write_fieldsInRecursiveWay( ) determines in step 735 that the threshold condition has been satisfied, the system in step 740 and lines (145e)-(150e) sets the binary Boolean variable unwindAllWhenReachedThreshold to a TRUE value, to indicate that the threshold has been reached, and then creates a new marker that identifies the current reference field being processed by the inner iterative procedure of steps 730-745. This marker comprises an index value that points to the next reference field to be serialized. For example, if the object passed to write_fieldsInRecursiveWay( ) comprises three lower-level reference fields, the first iteration of the inner iterative procedure will create a marker that comprises the first of the three reference fields and an index value of 1. This index value identifies that the next reference field to be serialized will be the first of the three fields.

In line (155e), write_fieldsInRecursiveWay( ) stores the newly created marker in the future-work queue and, in line (160e), returns to line (65e) of write_value( ). Because the index value passed to write_value( ) is not equal to −1, write_value( ) then writes metadata and primitive fields of the passed lower-level reference field and in line (85e) recursively calls write_fieldsInRecursiveWay( ) to begin serializing the even-more-deeply nested level of reference fields comprised by the passed lower-level reference field.

Because the previous iteration of write_fieldsInRecursiveWay( ) set Boolean variable unwindAllWhenReachedThreshold to a TRUE value, now performs steps (110e)-(120e). These steps create a new marker that identifies the reference field most recently passed to write_fieldsInRecursiveWay( ) and an index value that points to the next field to be serialized. For example, if the current iteration of write_fieldsInRecursiveWay( ) is serializing an object that has five reference fields, and if the inner procedure of steps 730-745 is currently serializing the third of those five fields, this index value would be set to 4, to point to the next reference field of the five.

Finally, write_fieldsInRecursiveWay( ) in line (115e) adds this new marker to the queue and returns control to write_value( ), which continues to serialize each field of each object by recursively calling write_fieldsInRecursiveWay( ) in this way.

Whenever the threshold condition is not met, indicating that there is no imminent likelihood of a stack-overflow error, write_fieldsInRecursiveWay( ) continues to recursively call write_value( ) to serialize the hierarchy of serializable objects in a manner similar to that of previously described embodiments and examples. But when write_fieldsInRecursiveWay( ) determines in line (145e) that the threshold condition has been met, indicating that there is an imminent likelihood of a stack-overflow error, write_fieldsInRecursiveWay( ) sets the Boolean flag variable to indicate this likely error in line (145e) and returns a non-negative index value to write_value( ). write_value( ) then, in response to receiving the passed non-negative index value, recursively calls write_fieldsInRecursiveWay( ) so as to enqueue the current marker to the queue in line (115e), rather than allowing the recursive procedure to continue to add markers to the queue.

The result of this procedure is that, when the recursive data-serialization system identifies a likelihood that a stack-overflow condition is imminent, the stack is emptied, or allowed to empty by continued operation of the recursive procedure, and new markers are instead enqueued to the queue-like structure instead of being pushed to the stack.

This procedure may be modified in a straightforward manner, by any means known in the art of computer programming, such that, when the recursive data-serialization system identifies a likelihood that a stack-overflow condition is imminent, the stack is only partially emptied.

In either case, some embodiments may continue using the queue instead of a stack until a second threshold condition is met. This second threshold condition may comprise any of the threshold conditions, or a negation of any of the threshold conditions, described in this document. For example, in the above pseudocode example, a threshold condition is satisfied when stack utilization exceeds a predetermined threshold value. In such a case, the data-serialization algorithm may be adapted to return to a normal recursive algorithm whenever it is determined that utilization no longer exceeds the predetermined threshold, when a certain number of objects have been serialized after unwinding the stack, or when a certain period of time has passed.

Figure 8:
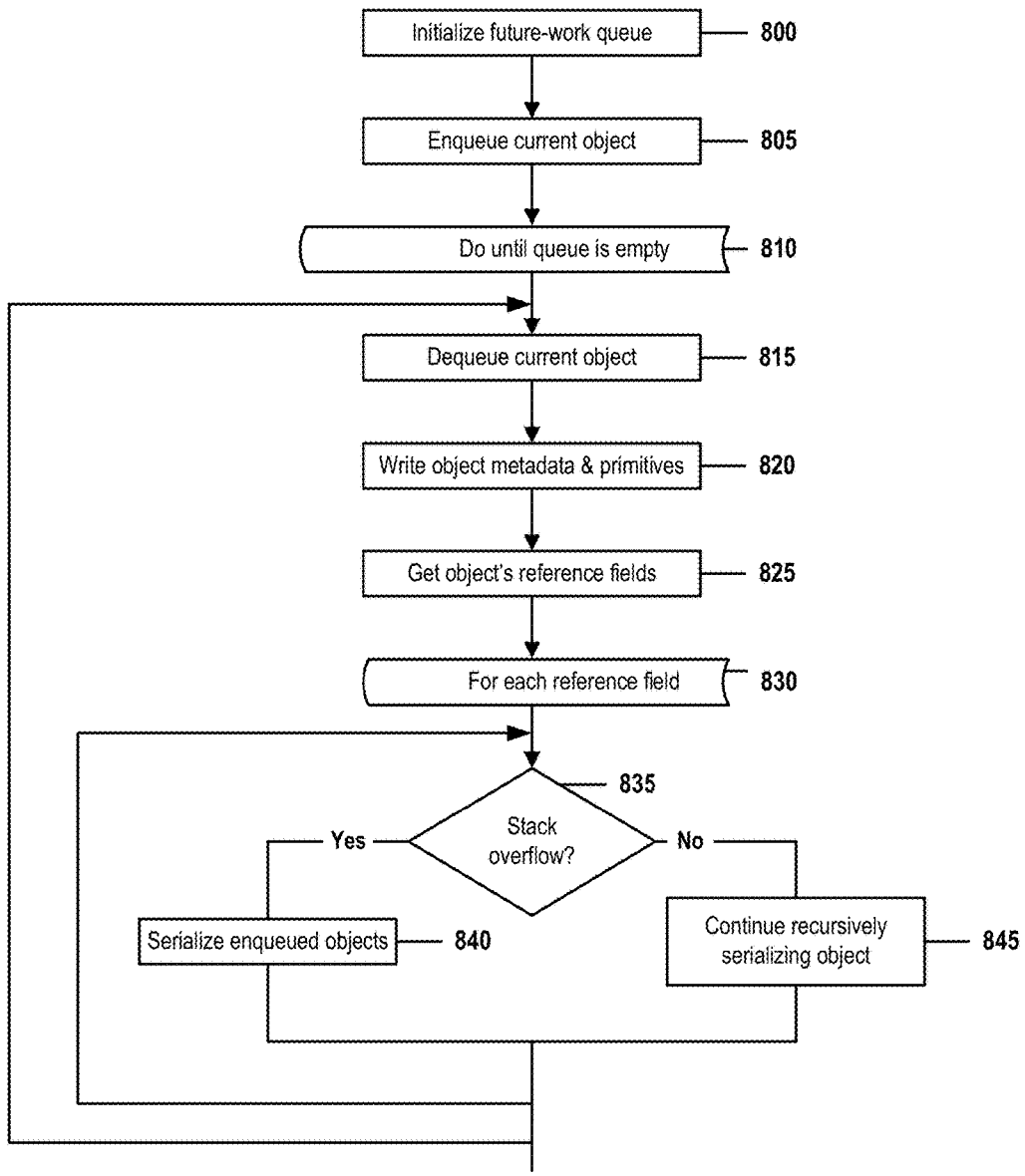
FIG. 8 is a flow chart that describes an embodiment of the present invention that dynamically offloads portions of stored stack data to a future-work queue when detecting that a stack-overload condition will occur if a recursive serialization procedure is allowed to proceed.

FIG. 8 is a flow chart that describes an embodiment of the present invention that dynamically offloads portions of stored stack data to a future-work queue when detecting that a stack-overload condition will occur if a recursive serialization procedure is allowed to proceed. FIG. 8 comprises steps 800-845.

As with the method of FIG. 7, the method of FIG. 8 unwinds all or part of a recursive data-serialization system's call stack when the system determines that a stack-overflow error will occur if the recursive algorithm continues. In response to such a determination, the system stores the current stack state into resizable, queue or queue-like data structure, and then resumes the recursive method with the stack. Like the method of FIG. 7, this embodiment allows a large number of fields to be serialized by a recursive method and more effectively utilizes the maximum storage capacity of the call stack.

Because a large portion of the embodiments and examples described here are similar to those of analogous embodiments of FIG. 7, only the core concept of FIG. 8 is described here in detail. As with the method of FIG. 7, the method of FIG. 8 may be combined with embodiments and examples described in this document.

In step 800, the recursive data-serialization system initializes a future-work queue data structure in a manner similar to that described by step 800 of FIG. 8. As in FIG. 7, this queue or queue-like data structure will temporarily store serialized objects and indices, rather than storing them on a recursive call stack, when a threshold condition indicates that the recursive algorithm's stack is in danger of triggering a stack-overflow error.

In step 805, the algorithm adds the object currently being serialized to the future work queue as a marker that comprises an index value of −1. This index value indicates that metadata and primitive values of the current object have not yet been serialized.

Step 810 begins an outer iterative procedure of steps 810-845 that repeats until the future-work queue has been emptied out.

In step 815, the system dequeues the most recently queued marker and passes the dequeued marker to a recursive object-serializing routine analogous to FIG. 7's write_value( ) routine.

In step 820, in response to receiving an index-value parameter of −1, write_value( ) serializes the metadata and primitive fields of the object identified by the dequeued marker. write_value( ) then increments the marker value (in this instance, to a value of 0) to indicate that the current object's metadata and primitives do not need to be serialized again.

In step 825, write_value( ) then calls a version of the write_fieldsInRecursiveWay( ) routine to serialize reference fields of the current serializable object. The following pseudocode is an exemplary version of this routine that is consistent with embodiments of FIG. 8.

serializing the next field would generate a stack-overflow error, the nthe method of FIG. 8 continues with step 840. Otherwise, the method of FIG. 8 instead performs step 845. In either case, the method of FIG. 8 then begins performing the next iteration of the inner iterative procedure of step 830-845.

If write_fieldsInRecursiveWay( ) determines in step 835 that a stack-overflow error will not be generated by an attempt to serialize the next field, the system in step 845 and lines (65f)-(80f) and (25f)-(40f) continues to perform a recursive data-serialization procedure by means of pseudo code routines and instructions similar to analogous pseudo-code implementing step 745 of FIG. 7. This additional code is not shown here, but may be similar in form and function to that of step 745.

If write_fieldsInRecursiveWay( ) determines in step 835 that a stack-overflow error will be generated by an attempt to serialize the next field, the system in step 840 and lines (65f)-(80f) and (25f)-(40f) performs actions, similar to those of step 735 of FIG. 7, to allow routine write_fieldsInRecursiveWay( ) to recursively serialize remaining objects and reference fields.

The result of this procedure is that, when the recursive data-serialization system identifies that serializing one more object or field will trigger a stack-overflow error, the stack is emptied, or allowed to empty by continued operation of

```
(10f)public void write_fieldsInRecursiveWay (Serializable object, int index) {
(15f)   Fields[ ] fields = class_desc.getReferenceFields (object.getClass( ));
(20f)   for(int i = index; i < fields.length; i++){
(25f)     if(unwindAllFramesWhenOverflowError == true) {
(30f)       Recursionmarker marker = new RecursionMarker (object, i + 1);
(35f)       futureWorkaadd(marker);
(40f)       return;
(45f)     }else {
(50f)       try {
(55f)           write_value(field, −1);
            }
          }
(60f)     }catch(StackOverflowError soe ) {
(65f)       unwindAllFramesWhenOverflowError = true;
(70f)       Recursionmarker marker = new RecursionMarker (object, i);
(75f)       futureWorkQ.add(marker);
(80f)       return;
          }
       }
}
```

As shown in the above pseudocode, this invention starts unwinding all the stack frames when stack overflow error occurs. Later these objects are serialized one by one in recursive manner. This helps to improve the performance even further as in few cases the intermediate data structures may not be allocated at all.

line (15f), write_fieldsInRecursiveWay( ) begins this procedure by calling a helper routine to return a list of the reference fields comprised by the current object.

Step 830 and line (20f) begin an inner iterative procedure of steps 830-845 that is performed once for each reference field of the current serializable object. Each iteration of this inner iterative procedure attempts to serialize all fields and metadata of the lower-level object identified by the current reference field.

In step 835 and line (55f), write_fieldsInRecursiveWay( ) calls a helper routine try, which simulates a call to routine write_value( ) that would serialize a next field. If, in response to this call, write_fieldsInRecursiveWay( ) determines, by means of helper routine catch( ) in line (60f), that the recursive procedure, and new markers are instead enqueued to the queue-like structure instead of being pushed to the stack.

As with embodiments of FIG. 7, the method of FIG. 8 may be modified in a straightforward manner, by any means known in the art of computer programming, such that, when the recursive data-serialization system identifies a likelihood that a stack-overflow condition is imminent, the stack is only partially emptied.

In either case, some embodiments may continue using the queue instead of a stack until a second threshold condition is met. This second threshold condition may comprise any of the threshold conditions, or a negation of any of the threshold conditions, described in this document. For example, in the above pseudocode example, a threshold condition is satisfied when stack utilization exceeds a predetermined threshold value. In such a case, the data-serialization algorithm may be adapted to return to a normal recursive algorithm whenever it is determined that utilization no longer exceeds the predetermined threshold, when a certain number of objects have been serialized after unwinding the stack, or when a certain period of time has passed.

As with the embodiments and examples illustrated by FIGS. 5-7, the above embodiments and examples illustrated by FIG. 8 do not limit the scope of the present invention to the pseudocode snippets described here. The present invention comprises any embodiment that uses known computer-programming languages, techniques, technologies, and methods to embody the inventive concepts described here.

What is claimed is:

1. A data-serialization system comprising a processor, a memory coupled to the processor, and a computer-readable hardware storage device coupled to the processor, the storage device containing program code configured to be run by the processor via the memory to implement a method for dynamic reduction of stack-overflow errors in a recursive data-serialization procedure, the method comprising:
    launching the recursive data-serialization procedure to serialize each object of a hierarchy of serializable data objects, where the recursive data-serialization procedure temporarily stores a state of a partially serialized object as a frame of a stack data structure,
        where each object is capable of comprising at least one field,
        where each field of the at least one field is either a primitive field or a reference field,
        where a primitive field stores a value,
        where a reference field of a parent object of the hierarchy identifies another object of the hierarchy, and
        where the another object is organized within the hierarchy as a child of the reference field;
    determining that a threshold condition has been satisfied, where the threshold condition is selected, where the satisfaction of the threshold condition indicates an unacceptable likelihood that the recursive data-serialization procedure will generate a stack-overflow error; and
    performing a corrective action in response to the determining,
        where the corrective action is capable of preventing the stack-overflow error, and
        where the corrective action comprises:
        pausing the recursive data-serialization procedure;
        deleting data from the stack data structure by popping frames of the stack data structure;
        storing the popped frames in a variable-size queue-like data structure; and
        resuming, by the recursive data-serialization procedure, serialization of the hierarchy of serializable data objects.

2. The system of claim 1, where the threshold condition is a determination that a number of objects of the hierarchy that have been serialized by the recursive data-serialization procedure exceeds a threshold value.

3. The system of claim 1, where the threshold condition is a determination that a utilization of the stack exceeds a threshold value.

4. The system of claim 1, where the threshold condition is a determination that the recursive data-serialization procedure has triggered a stack-overflow error.

5. The system of claim 1, where the corrective action further comprises:
    terminating the recursive data-serialization procedure; and
    initiating a nonrecursive data-serialization procedure that resumes serialization of the hierarchy of serializable data objects from the point at which the recursive data-serialization procedure was terminated.

6. The system of claim 1, where a first object of the hierarchy is an instance of an object class and where each field comprised by the first object is capable of being a subclass of the object class.

7. A method for dynamic reduction of stack-overflow errors in a recursive data-serialization procedure, the method comprising:
    launching the recursive data-serialization procedure to serialize each object of a hierarchy of serializable data objects, where the recursive data-serialization procedure temporarily stores a state of a partially serialized object as a frame of a stack data structure,
        where each object is capable of comprising at least one field,
        where each field of the at least one field is either a primitive field or a reference field,
        where a primitive field stores a value,
        where a reference field of a parent object of the hierarchy identifies another object of the hierarchy, and
        where the another object is organized within the hierarchy as a child of the reference field;
    determining that a threshold condition has been satisfied, where the threshold condition is selected, where the satisfaction of the threshold condition indicates an unacceptable likelihood that the recursive data-serialization procedure will generate a stack-overflow error; and
    performing a corrective action in response to the determining,
        where the corrective action is capable of preventing the stack-overflow error, and
        where the corrective action comprises:
        pausing the recursive data-serialization procedure;
        deleting data from the stack data structure by popping frames of the stack data structure;
        storing the popped frames in a variable-size queue-like data structure; and
        resuming, by the recursive data-serialization procedure, serialization of the hierarchy of serializable data objects.

8. The method of claim 7, where the threshold condition is a determination that a number of objects of the hierarchy that have been serialized by the recursive data-serialization procedure exceeds a threshold value.

9. The method of claim 7, where the threshold condition is a determination that a utilization of the stack exceeds a threshold value.

10. The method of claim 7, where the threshold condition is a determination that the recursive data-serialization procedure has triggered a stack-overflow error.

11. The method of claim 7, where the corrective action further comprises:
    terminating the recursive data-serialization procedure; and
    initiating a nonrecursive data-serialization procedure that resumes serialization of the hierarchy of serializable data objects from the point at which the recursive data-serialization procedure was terminated.

12. The method of claim 7, further comprising providing at least one support service for at least one of creating, integrating, hosting, maintaining, and deploying computer-readable program code in the computer system, wherein the computer-readable program code in combination with the computer system is configured to implement the launching, the determining, and the performing.

13. A computer program product, comprising a computer-readable hardware storage device having a computer-readable program code stored therein, the program code configured to be executed by a data-serialization system comprising a processor, a memory coupled to the processor, and a computer-readable hardware storage device coupled to the processor, the storage device containing program code configured to be run by the processor via the memory to implement a method for dynamic reduction of stack-overflow errors in a recursive data-serialization procedure, the method comprising:

launching the recursive data-serialization procedure to serialize each object of a hierarchy of serializable data objects, where the recursive data-serialization procedure temporarily stores a state of a partially serialized object as a frame of a stack data structure, where each object is capable of comprising at least one field, where each field of the at least one field is either a primitive field or a reference field, where a primitive field stores a value, where a reference field of a parent object of the hierarchy identifies another object of the hierarchy, and where the another object is organized within the hierarchy as a child of the reference field;

determining that a threshold condition has been satisfied, where the threshold condition is selected, where the satisfaction of the threshold condition indicates an unacceptable likelihood that the recursive data-serialization procedure will generate a stack-overflow error; and performing a corrective action in response to the determining, where the corrective action is capable of preventing the stack-overflow error, and where the corrective action comprises:

pausing the recursive data-serialization procedure;

deleting data from the stack data structure by popping frames of the stack data structure;

storing the popped frames in a variable-size queue-like data structure; and resuming, by the recursive data-serialization procedure, serialization of the hierarchy of serializable data objects.

14. The computer program product of claim 13, where the threshold condition is a determination that a number of objects of the hierarchy that have been serialized by the recursive data-serialization procedure exceeds a threshold value.

15. The computer program product of claim 13, where the threshold condition is a determination that a utilization of the stack exceeds a threshold value.

16. The computer program product of claim 13, where the threshold condition is a determination that the recursive data-serialization procedure has triggered a stack-overflow error.

17. The computer program product of claim 13, where the corrective action further comprises:

terminating the recursive data-serialization procedure; and initiating a nonrecursive data-serialization procedure that resumes serialization of the hierarchy of serializable data objects from the point at which the recursive data-serialization procedure was terminated.

* * * * *